(12) United States Patent
Simpson et al.

(10) Patent No.: US 9,327,510 B2
(45) Date of Patent: May 3, 2016

(54) VERIFICATION RECORD FOR A REPLACEABLE SUPPLY

(75) Inventors: Shell S Simpson, Boise, ID (US); Paul L Jeran, Boise, ID (US); Stephen D Panshin, Corvallis, OR (US); Jefferson P Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/352,956

(22) PCT Filed: Oct. 25, 2011

(86) PCT No.: PCT/US2011/057644
§ 371 (c)(1),
(2), (4) Date: Apr. 18, 2014

(87) PCT Pub. No.: WO2013/062528
PCT Pub. Date: May 2, 2013

(65) Prior Publication Data
US 2014/0267476 A1    Sep. 18, 2014

(51) Int. Cl.
| | |
|---|---|
| *B41J 29/38* | (2006.01) |
| *B41J 2/175* | (2006.01) |
| *G06F 3/12* | (2006.01) |
| *H04L 9/32* | (2006.01) |

(52) U.S. Cl.
CPC .......... *B41J 2/17543* (2013.01); *G06F 3/1203* (2013.01); *G06F 3/1229* (2013.01); *G06F 3/1273* (2013.01); *H04L 9/3271* (2013.01)

(58) Field of Classification Search
CPC .............................. B41J 2/035; B41J 2/17546
USPC ........................................ 347/6, 7, 85, 5, 86
See application file for complete search history.

(56) References Cited

U.S. PATENT DOCUMENTS

| | | | | |
|---|---|---|---|---|
| 6,672,695 | B1 * | 1/2004 | Naka et al. ........................ | 347/7 |
| 2004/0136768 | A1 | 7/2004 | Klinefelter et al. | |
| 2006/0279588 | A1 * | 12/2006 | Yearworth et al. ................ | 347/6 |
| 2009/0047997 | A1 | 2/2009 | Silverbrook | |
| 2010/0085404 | A1 | 4/2010 | Akiyama | |
| 2010/0128567 | A1 | 5/2010 | Acker et al. | |
| 2010/0209123 | A1 | 8/2010 | Katogi et al. | |

FOREIGN PATENT DOCUMENTS

| | | |
|---|---|---|
| JP | 2003-118143 | 4/2003 |
| JP | 2003-223523 | 8/2003 |
| KR | 1020040006406 | 1/2004 |

* cited by examiner

*Primary Examiner* — Lam Nguyen
(74) *Attorney, Agent, or Firm* — Tarolli, Sundheim, Covell & Tummino L.L.P.

(57) ABSTRACT

One example discloses a system comprising a computer comprising a memory to store machine readable instructions. The system can also comprise a processing unit to execute the machine readable instructions, the machine readable instructions comprising a data collector. The data collector can receive a plurality of verification records from a printer. Each verification record can characterize a usage of a given replaceable supply at the printer. The data collector can also evaluate a verification history of the printer based on the plurality of verification records to determine a usage credit for the printer. The usage credit can correspond to a number of authentic replaceable supplies consumed at the printer.

20 Claims, 8 Drawing Sheets

FIG. 1

| VERIFICATION RECORD | |
|---|---:|
| RECORD ID | 1234 |
| SUPPLY MODEL NO. | 456 |
| SUPPLY SERIAL NO. | 789487 |
| SUPPLY LIFE | 30% |
| SUPPLY LOW | NO |
| MANUFACTURING DATE | 1/23/2010 |
| VERIFICATION COUNTER | 6 |
| SUPPLY PAGE COUNT | 185 |
| PAGE COUNT BREAK | YES |
| AUTHENTIC SUPPLY | YES |
| TAG SIGNATURE | 12954879257 |
| SECURITY CHIP SIGNATURE | SIGNED DIGEST |

FIG. 2

| HISTORY RECORD | | | | |
|---|---|---|---|---|
| REQUEST ID | 197873 | | | |
| PRINTER ID | 765 | | | |
| USAGE CREDIT | 1 | | | |
| SUPPLY SERIAL NO. | NO. PAGES | PAGE COUNT BREAK | AUTHENTIC | LOW |
| 789487 | 558 | YES | YES | YES |
| 897048 | 45 | NO | NO | NO |
| 587970 | 780 | NO | YES | YES |
| 457615 | 50 | NO | YES | NO |

VERIFICATION RECORD FOR A REPLACEABLE SUPPLY

RELATED APPLICATION

The present invention claims priority from PCT/US2011/057644, filed 25 Oct. 2011, herein incorporated by reference in its entirety.

BACKGROUND

A toner cartridge, also called laser toner, is the consumable component of a laser printer. Toner cartridges contain toner powder, a fine, dry mixture of plastic particles, carbon, and black or other coloring agents that make an image on paper. The toner is transferred to paper via an electrostatically charged drum unit, and fused onto the paper by heated rollers during the printing process. An ink cartridge or inkjet cartridge is a replaceable component of an inkjet printer that contains the ink (and sometimes a print head) that is deposited onto paper during printing. Each ink cartridge contains one or more partitioned ink reservoirs. Certain manufacturers also add electronic contacts and a chip that communicates with the printer. Some ink and toner cartridges can be refilled.

DETAILED DESCRIPTION

Figure 1:
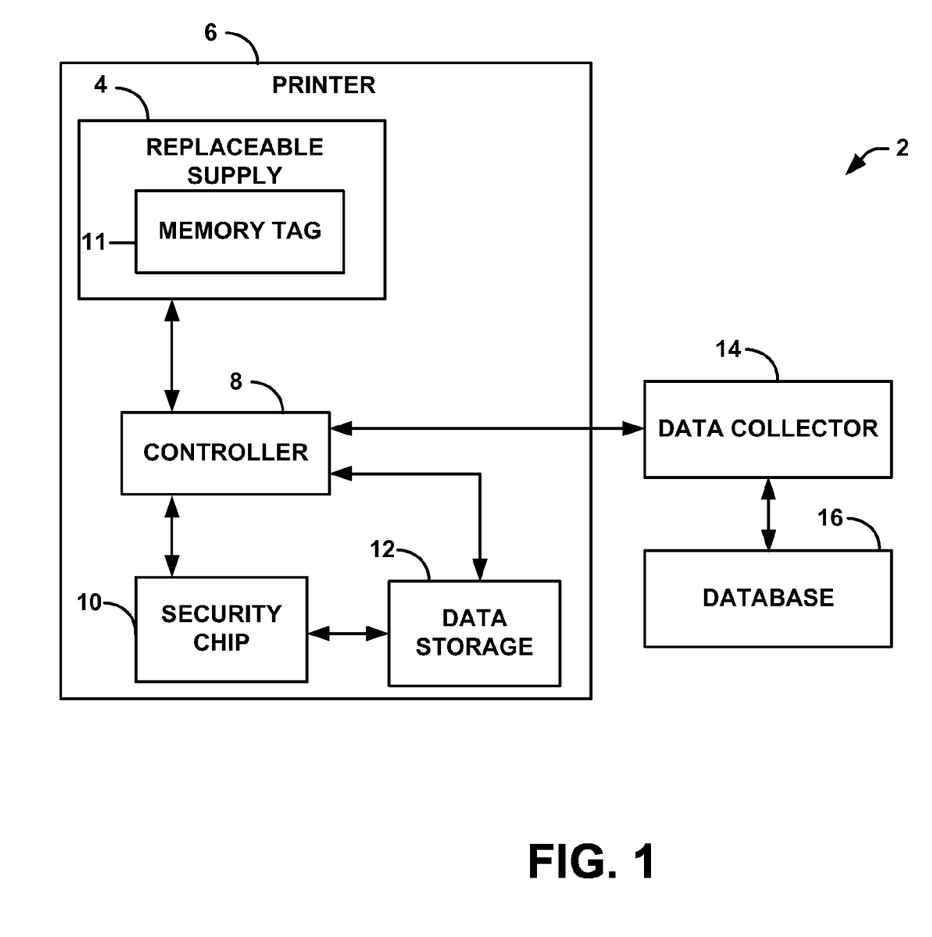
FIG. 1 illustrates an example of a system that can be employed to verify and/or collect data characterizing a usage of a replaceable supply at a printer.

FIG. 1 illustrates an example of a system 2 that can be employed to verify and/or collect data characterizing a usage of a replaceable supply 4 (e.g., a replaceable supply) at a printer 6 included in the system 2. The printer 6 could be implemented, for example, as a laser printer, an inkjet printer, a plotter, etc. The replaceable supply 4 can be inserted into the printer 6. The replaceable supply 4 could be, for example, a toner cartridge, an ink cartridge, etc. The type of replaceable supply 4 employed can be based on the type of the printer 6.

The printer 6 can include a controller 8. The controller 8 can be implemented, for example, as hardware (e.g., an application-specific integrated circuit chip), software (machine readable instructions that are executed by a processor core), or a combination thereof (e.g., firmware embedded on a microcontroller). In some examples, such as situations where the printer 6 is implemented as a laser printer, the controller 8 can include a formatter that can receive print jobs (e.g., from a computer) and convert the print jobs to a laser image. Moreover, the controller 8 can also include a print engine that can feed paper and control the laser to execute the print job (e.g., print to paper).

The printer 6 can include a security chip 10. The security chip 10 could be implemented as an integrated circuit chip. The security chip 10 could be implemented as a secure crypto processor. The security chip 10 can perform cryptographic operations, embedded in a packaging with multiple physical security measures, thereby providing the security chip 10 a degree of tamper resistance. The security chip 10 could be implemented, for example, as a smart card or a trusted platform module (TPM) chip. The security chip 10 can include a random number generator that can generate a random number employable for encryption. The security chip 10 can also include an asymmetric key, such as a private key that is inaccessible (e.g., tamper-resistant). The private key can be associated with a corresponding public key. The security chip 10 can be configured and/or programmed to digitally sign data, encrypt data and decrypt data. For instance, the security chip 10 can decrypt data with the private key that has been encrypted with the public key. Moreover, the security chip 10 can employ the private key to digitally sign a digest of data (e.g., by employing a one-way hashing function), wherein the digital signature can be verified by employing the corresponding public key and the one-way hashing function. The public key can be stored on another system. In some examples, the security chip 10 can include a digital signature stored thereon, which can be referred to as a stored digital signature. The stored digital signature can be implemented, for example, as a digital signature of raw data or a digest generated at a time of manufacture of the security chip 10. In such a situation, the raw data or digest can be stored at a secure location (e.g., a server) and can be employed to verify the stored digital signature at a later time.

The controller 8 can detect insertion of the replaceable supply 4 into the printer 6. The replaceable supply 4 may be inserted into the printer 6, for example, to replace a cartridge that is low on ink or toner. Upon detecting such an insertion, the controller 8 can initiate a verification process of the replaceable supply 4. Additionally or alternatively, the verification process can be initiated by the controller 8 periodically and/or randomly.

Upon initiation of the verification process, the controller 8 can signal the security chip 10 to generate a challenge code. The challenge code could be employed, for example, as a cryptographically generated random number. The challenge code can have, for example, a high entropy value. The challenge code can be returned to the controller 8. The controller 8 can provide the challenge code to a memory tag 11 included in the replaceable supply 4. The memory tag 11 can be implemented as a secure crypto processor, similar to the security chip 10. In response to the challenge code, the memory tag 11 can cryptographically generate a response to the challenge code, which can be referred to as response data. In some examples, the response data can include a digitally signed version of the challenge code. In such a situation, the secure memory tag 11 can employ a (asymmetric) private key stored in the memory tag 11 to digitally sign the challenge code. In some examples, the response data can include additional information, such as a model of the replaceable supply 4, a life indicator of the replaceable supply 4, a serial number of the replaceable supply 4 and a manufacturing date of the replaceable supply 4.

The response data can be provided to the controller 8. In some examples, the controller 8 can forward the digitally signed challenge code to the security chip 10. The security chip 10 can verify an authenticity of the replaceable supply 4 by verifying the response to the challenge code. To verify the authenticity, in some examples, the security chip 10 can employ a stored public key corresponding to the private key of the memory tag 11 to verify the digital signature of the challenge code. The security chip 10 can digitally sign the results of the verification and store the results of the verification in a verification record, which could be stored in data storage 12. Accordingly, the verification record can characterize the results of the verification of authenticity and a usage of the replaceable supply 4 at the printer 6. The data storage 12 could be implemented, for example, as random access memory (RAM), such as nonvolatile RAM (NVRAM). In some examples, the data storage 12 could be secure (e.g., embedded in the security chip 10), while in other examples, the data storage 12 could be unsecure (accessible by the controller 8). In examples where the data storage 12 is secure, the security chip 10 could write the verification record into the data storage 12. In examples where the data storage 12 is unsecure, the security chip 10 can forward the verification record to the controller 8, and the controller 8 can write the verification record into the data storage 12.

Figure 2:
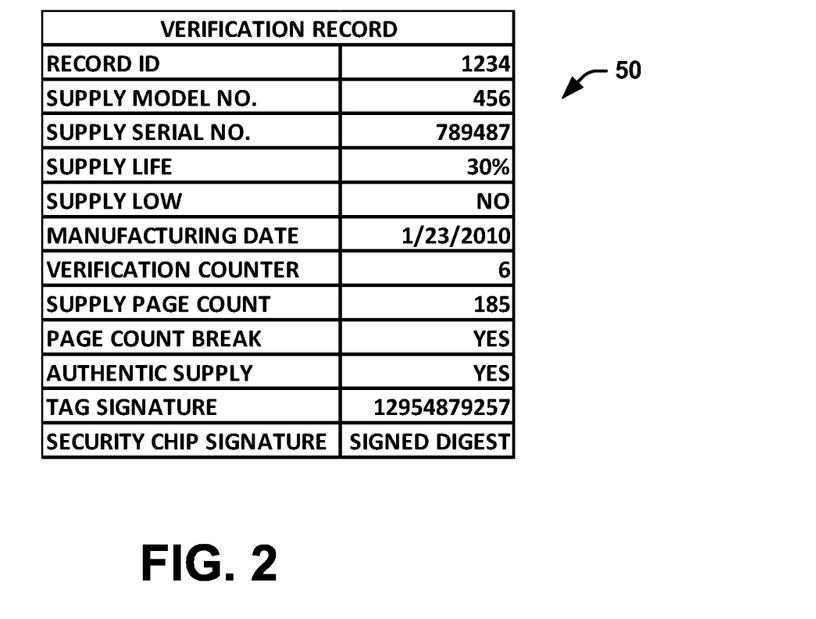
FIG. 2 illustrates an example of a verification record.

FIG. 2 illustrates an example of the verification record 50 that could be stored in the data storage 12 illustrated in FIG. 1. The verification record 50 can include a record identifier (labeled in FIG. 2 as "RECORD ID"). The record identifier could be implemented, for example, as a key field for the verification record 50. The verification record 50 can also include a model number of the replaceable supply (labeled in FIG. 2 as "SUPPLY MODEL NO."), a serial number of the replaceable supply (labeled in FIG. 2 as "SUPPLY SERIAL NO.") and a manufacturing date (labeled in FIG. 2 as "MANUFACTURING DATE") of the replaceable supply. The model number and serial number of the replaceable supply can be based, for example, on the response data. In a similar manner, the verification record 50 can include a remaining life percentage (labeled in FIG. 2 as "SUPPLY LIFE") of the replaceable supply. The remaining life percentage can characterize, for example, a currently remaining percentage of a maximum ink or toner storable by the replaceable supply. For instance, a remaining life percentage of 30% (such as shown in FIG. 2), can indicate that the replaceable supply currently has 30% of its maximum storable toner or ink remaining.

The verification record 50 can also include a verification counter (labeled in FIG. 2 as "VERIFICATION COUNTER"). The verification counter can include, for example, a number that characterizes a number of times that a security chip 10 (such as the security chip 10 illustrated in FIG. 1) has verified the replaceable supply. In some examples, if the replaceable supply is refilled, the verification counter can be incremented, such that a new verification record 50 for the refilled replaceable supply need not be created. The verification record 50 can further include a page counter (labeled in FIG. 2 as "SUPPLY PAGE COUNT") for the replaceable supply. The page counter for the replaceable supply can characterize a number of pages printed with an associated printer (such as the printer 6 illustrated in FIG. 1) while employing the replaceable supply. The verification record 50 can include a page count break indicator (labeled in FIG. 2 as "PAGE COUNT BREAK"). The page count break can indicate whether a break in the page counter has been detected, which could indicate that another printer has employed the replaceable supply.

The verification record 50 can still further include a verification result (labeled in FIG. 2 as "AUTHENTIC SUPPLY") that can identify whether the replaceable supply is authentic. In some examples, verification of the replaceable supply can indicate whether the replaceable supply is a genuine supply, such as an original equipment manufacturers (OEM) supply. Moreover, if the replaceable supply cannot be verified, then the replaceable supply may be a pirated or an unauthorized remanufactured replaceable supply.

The verification record 50 can include a tag signature of the replaceable supply (labeled in FIG. 2 as "TAG SIGNATURE"). The tag signature can be stored, for example, in a memory tag of the replaceable supply. The tag signature can be a digital signature similar to the stored digital signature of the security chip 10 described with respect to FIG. 1. In such a situation, the tag signature can be generated from raw data or a digest (which can be stored securely at a server) at a time of manufacture of the replaceable supply. The verification record 50 can include a digital signature of the security chip (labeled in FIG. 2 as "SECURITY CHIP SIGNATURE"). The digital signature could be implemented, for example, as a digitally signed digest, which digest could be implemented, for example, as a portion of the verification record 50.

Referring back to FIG. 1, the verification result stored in the verification record can be provided to the controller 8. In some examples, the controller 8 can output the verification result to a user of the printer 6. For instance, in some examples, the printer 6 can include a display that can display the verification result to the user of the printer 6. In other examples, the controller 8 could provide the verification result to an external system (e.g., an attached computer), which external system could output the verification result to the user.

The printer 6 can be intermittently or continuously attached to a data collector 14. The data collector 14 could be implemented, for example, as machine readable instructions stored in memory and executed by a processing unit (e.g., a processor core) on a computer. In other examples, the data collector 14 could be implemented as hardware (e.g., a dongle) that can attach to the printer 6 through a data bus (e.g., universal serial bus, a communication port, a network port, etc). In yet other examples, the data collector 14 could be embedded in the printer 6, such as in the controller 8. In some examples, the data collector 14 could be representative of a data collector client executing on a client computer, as well as a data collector server executing on a server computer, wherein the client computer and the server computer communicate over a network.

The data collector 14 can be configured and/or programmed to request verification records stored in the data storage 12. For instance, in some examples, the data collector 14 can provide a request to the controller 8 for verification records, which request can be referred to as a record request. The record request can include a request identifier that can be implemented as a random number. In response, in some examples, such as examples where secure NVRAM is employed as the data storage 12, the controller 8 can provide the record request to the security chip 10. In other examples, such as examples where unsecure NVRAM is employed as the data storage 12, the controller 8 can access the data storage 12 to retrieve the verification records.

In examples where the security chip 10 receives the record request, the security chip 10 can retrieve the verification records from the data storage 12. The security chip 10 can digitally sign the verification records and the request identifier included in the record request using the private key of the security chip 10. Moreover, the security chip 10 can return the signed verification records and/or the signed request identifier to the controller 8. Moreover, in some examples, the security chip 10 can also forward the stored digital signature to the controller 8. The controller 8 can forward the signed verification records, the signed request identifier and the stored digital signature to the data collector 14.

In examples where the controller 8 retrieves the verification records, the controller 8 can forward the request identifier to the security chip 10. In response, the security chip 10 can digitally sign the request identifier and return the signed request identifier to the controller 8. Moreover, in some examples, the security chip 10 can also forward the stored digital signature to the controller 8. The controller 8 can forward the verification records stored in the data storage 12, the signed request identifier and the stored digital signature to the data collector 14.

The data collector 14 can employ a public key of the security chip 10 to verify the digital signature of the request identifier. Such a verification of the digital signature ensures that verification records originated from a trustworthy source, namely the security chip 10 and that the response to the request for the verification records is fresh (e.g., not generated before the generation of the request identifier). In some examples, the data collector 14 can employ the stored digital signature to verify the authenticity of the security chip 10. Additionally, the data collector 14 can employ the digital signature of the verification records, individual digital signatures and/or tag signatures stored in the verification records to verify the authenticity of the verification records. Such a verification of the authenticity ensures that the verification records have not been tampered with.

The data collector 14 can evaluate a verification history of the authenticated verification records. Such an evaluation of the verification history can include, for example, determining whether a replaceable supply 4 associated with a verification record received from the printer 6 has been associated with another printer. In this manner, the data collector 14 can ensure that the verification history accurately reflects the usage of replaceable supplies at the printer 6. Moreover, to evaluate the verification history, the data collector 14 can determine a number of authentic (e.g., genuine OEM) replaceable supplies that have been employed at the printer 6, as well as a number of pages printed by using the authentic (verified) replaceable supplies. In some examples, evaluation of the verification history can include the data collector 14 determining if there has been a page count break for a given replaceable supply 4. In still other examples, the data collector 14 can determine whether the given replaceable supply 4 has reached the low threshold. The data collector 14 can evaluate the verification history to determine a usage credit that can correspond to a number of authentic replaceable supplies that have (i) printed a threshold number of pages (ii) have no page count break and (iii) have reached the low threshold. Stated differently, the usage credit can characterize a number of authentic replaceable supplies that have been substantially consumed by the printer 6. In other examples, different criteria can be employed to determine the usage credit. The data collector 14 can store the verification history in a history record, which history record can be stored in a database 16. The database could be stored, for example, in a memory (e.g., volatile or nonvolatile RAM). In some examples, the database could be implemented as a table.

Figure 3:
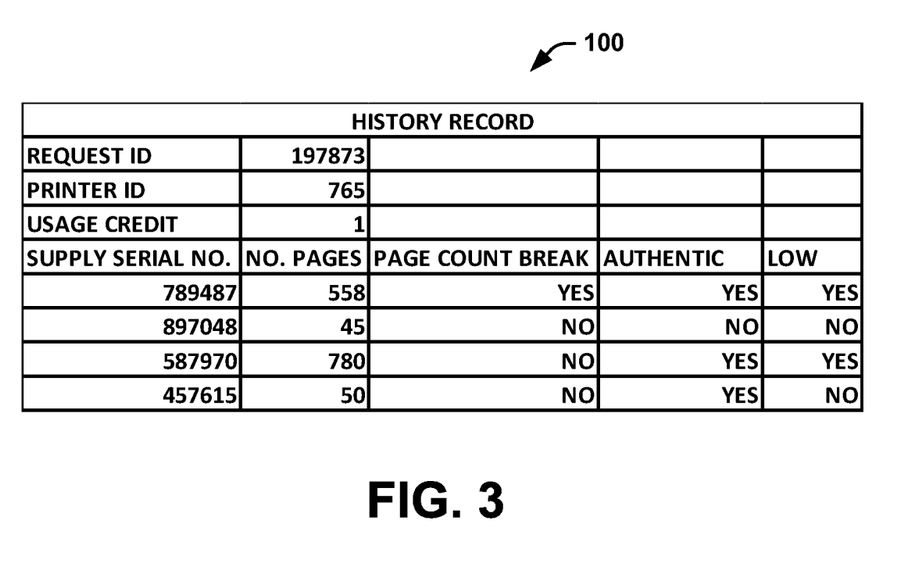
FIG. 3 illustrates an example of a history record.

FIG. 3 illustrates an example of a history record 100 that could be employed as the history record 100 for the printer 6 illustrated in FIG. 1. The history record 100 can include a request identifier (labeled in FIG. 3 as "REQUEST ID") employed to request the verification history of the printer. The history record 100 can include a printer identifier (labeled in FIG. 3 as "PRINTER ID") that includes an identification code for a printer associated with the history record 100. The history record 100 can include a plurality of replaceable supply serial numbers (labeled in FIG. 3 as "SUPPLY SERIAL NO."). A given supply serial number can be associated with a number of pages printed with a replaceable supply associated with the given supply serial number (labeled in FIG. 3 as "NO. PAGES"). The history record 100 can also list whether a page count break (labeled in FIG. 3 as "PAGE COUNT BREAK") was detected for the replaceable supply associated with the given supply serial number. The history record 100 can further include a field that indicates whether the replaceable supply associated with the given supply serial number has reached a low threshold (indicated in FIG. 3 as "LOW"). In other examples, different and/or additional data fields could be employed. For instance, in some examples, the history record could include a metric reflecting a percentage of usage of toner or ink (e.g., supply life) at the replaceable supply.

The history record 100 can include a field that indicates whether the replaceable supply associated with a given supply serial number has been verified to be authentic (labeled in FIG. 3 as "AUTHENTIC"). An authentic replaceable supply can be a replaceable supply that has been verified by a printer and has not reached a predetermined page count threshold with a different printer before. The history record 100 can also include a usage credit (labeled in FIG. 3 as "USAGE CREDIT") that can characterize a number of authentic replaceable supplies that have printed at least the page count threshold number of pages, have reached the low threshold and have no page count break. In other examples, other factors, such as a percentage of a supply life can be additionally or alternatively employed to determine the usage credit. In these examples, the usage credit can characterize a number of authentic replaceable supplies that have been substantially consumed by the printer identified in the printer identification.

Referring back to FIG. 1, the data collector 14 can employ the history record to determine whether the usage credit meets or exceeds a reward threshold. As an example, if the usage credit meets or exceeds the reward threshold, a reward can be provided to a user of the printer 6. The reward could include, an extended warranty, a new printer, a free or reduced price replaceable supply, etc. Moreover, multiple reward (progressive) thresholds can be employed. For instance, a first reward threshold could be three, wherein an extended warranty can be granted to the user of the printer 6, while a second reward threshold could be fifteen, wherein a new printer could be provided to the user of the printer 6. Further, the data collector 14 can employ the request identifier to ensure that a reward has not already been granted to the user for a current state of the history record associated with the printer 6. For instance, if multiple history records are associated with the printer 6 that have the same (or substantially similar) data fields, but different request identifiers, the data collector 14 may determine that a replay (e.g., an unauthorized duplication) of the history record is being attempted. In such a situation, the reward can be denied. Additionally or alternatively, in some examples, the data collector 14 can employ the digital signature of the request identifier to ensure that the response to the request for the verification records is fresh, since the digital signature of the request identifier cannot be generated before generation of the request identifier.

By employment of the system 2, a verification history of the replaceable supply 4 usage for the printer 6 can be tracked securely. In this manner, users (e.g. customers) that employ authentic (e.g., genuine OEM) replaceable supplies in the printer 6 can be rewarded. Moreover, by employment of the security chip 10 and the memory tag 11, the system 2 prevents tampering with the verification history.

Figure 4:
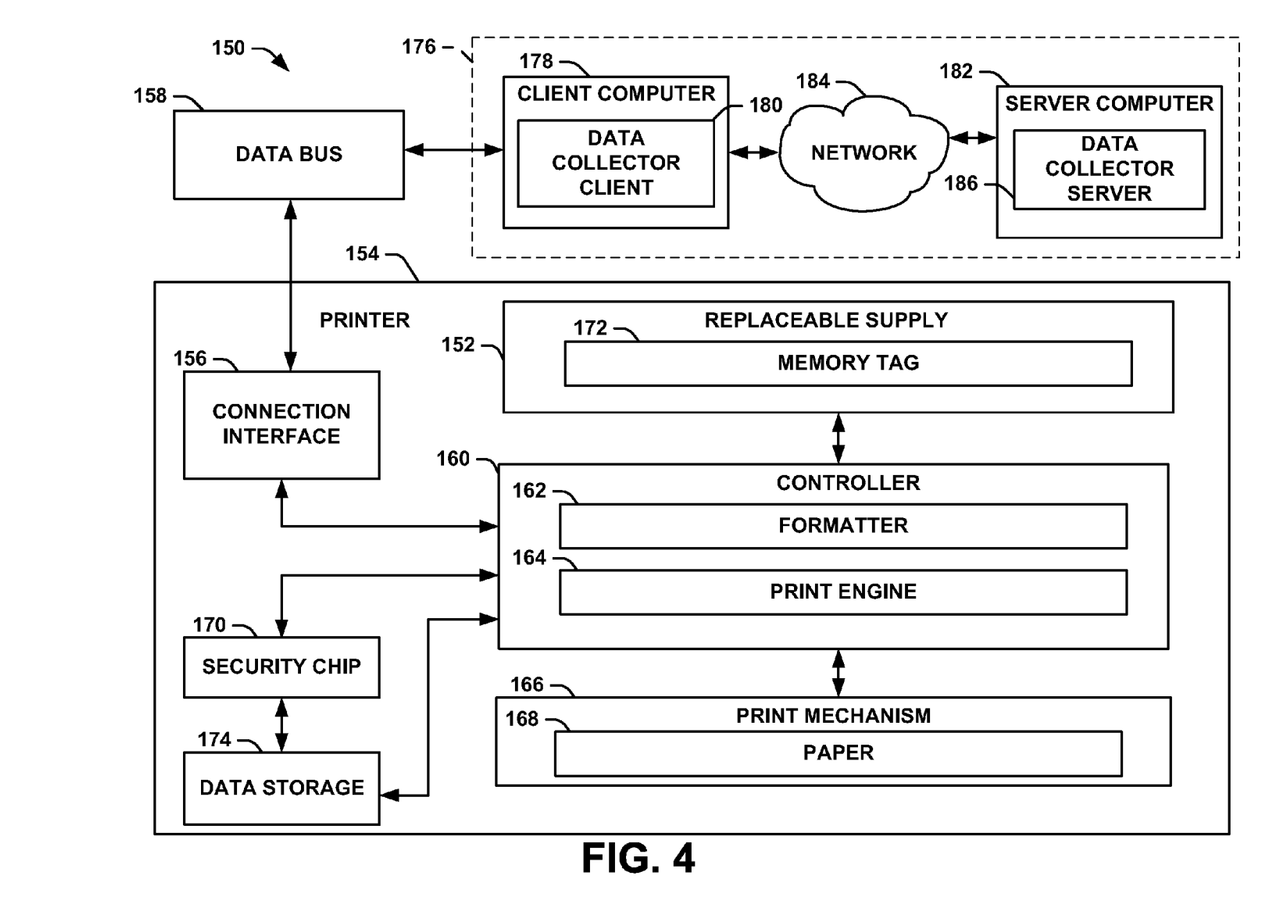
FIG. 4 illustrates another example of a system that can be employed to verify and/or collect data characterizing a usage of a replaceable supply at a printer.

FIG. 4 illustrates another example of a system 150 that can be employed to verify and/or collect data characterizing a usage of a replaceable supply 152 at a printer 154 included in the system 150. The printer 154 could be implemented, for example, as a laser printer. The printer 154 can include a connection interface 156 that can communicate with other entities (e.g., a computer and/or another printer) via a data bus 158. The data bus 158 could be implemented, for example, as a universal serial bus (USB), a parallel port, a serial port, a network port, etc.

The printer 154 can include a controller 160 that can send and receive data through the connection interface 156 to the data bus 158. The controller 160 could be implemented, for example, as software (e.g. machine-readable instructions executed by a processor core), hardware (e.g., an application-specific integrated circuit chip) or combination thereof (e.g., a microcontroller with embedded firmware). In some examples, the controller 160 can receive a print job from the data bus 158. The print job could be implemented, for example, as a document to be printed. Upon receipt of such a print job, the controller 160 can provide the print job to a formatter 162 which could be implemented in the controller 160. The formatter 162 can convert the print job into a laser image. Upon such a conversion, the formatter 162 can provide the converted print job to a print engine 164. The print engine 164 can include controls for operating a print mechanism 166 and the replaceable supply 152. The print mechanism 166 can include, for example rollers, a laser, a paper carriage, etc. Moreover, the print mechanism 166 can store paper 168 for printing. The print engine 164 can control the print mechanism 166 to print a document for the print job.

The replaceable supply 152 could be implemented, for example, as a toner cartridge. The replaceable supply 152 can include a reservoir for storing printing material (e.g., toner). The replaceable supply 152 can be removably inserted into the printer 154. Upon such an insertion, the controller 160 can be configured and/or programmed to initiate a verification procedure. In some examples, the controller 160 can initiate the verification procedure periodically and/or randomly.

The verification procedure can verify whether the replaceable supply 152 is authentic (e.g., a genuine OEM replaceable supply). Upon initiation of the verification procedure, the formatter 162 of the controller 160 can request a challenge code from a security chip 170 of the printer 154. The security chip 170 could be implemented, for example, as a secure crypto processor (e.g., a smart card, a TPM, etc.). In some examples, the security chip 170 can include a stored digital signature generated at a time of manufacture of the security chip 170. Accordingly, the security chip 170 can include an inaccessible private key that can be employed to encrypt, decrypt and digitally sign data. The private key can be an asymmetric key. Moreover, the private key can have a corresponding public key that can be employed to verify a digital signature of the security chip 170 and encrypt data that can only be decrypted with the private key. In response, the security chip 170 can generate a challenge code, which could be implemented as a cryptographically generated random number. The security chip 170 can return the challenge code to the formatter 162. The formatter 162 can provide the challenge code to the print engine 164, which in turn can provide the challenge code to a memory tag 172 included in the replaceable supply 152.

The memory tag 172 can be, for example, a secure memory tag and can be implemented in a manner similar to the security chip 170. Accordingly, the memory tag 172 can also store a private key that has an associated public key. In response to receipt of the challenge code, the memory tag 172 can generate response data. The response data can include a digitally signed version of the challenge code. In such a situation, the secure memory tag 172 can employ the private key of the memory tag 172 to digitally sign the challenge code. In some examples, the response data can include additional information, such as a model of the replaceable supply 152, a life indicator of the replaceable supply 152, a serial number of the replaceable supply 152, a tag signature stored in the memory 172 of the replaceable supply 152 and manufacturing date of the replaceable supply 152. The memory tag 172 can provide the response data to the print engine 164, which can in turn return the response data to the formatter 162.

The formatter 162 can provide the response data (or some portion thereof) to the security chip 170. The security chip 170 can employ the digitally signed challenge code to verify the authenticity of the replaceable supply 152. For instance, in some examples, the security chip 170 could employ a public key of the replaceable supply 152 to verify the digital signature of the digitally signed challenge code. Moreover, the security chip 170 can store the results of the verification in a verification record, which could be implemented in a manner similar to the verification record illustrated in FIG. 2. The verification record can be stored, for example in data storage 174 by the security chip 170 or the controller 160. The data storage 174 could be implemented, for example, as NVRAM, secure or unsecure. Moreover, the results of the verification (or some portion thereof) can be returned to the controller 160.

The controller 160 can provide data to a user that characterizes a result of the verification. For instance, in some examples, the data could be provided to the user through a display integrated in the printer 154. In other examples, the controller 160 can provide the data that characterizes the result of the verification to the connection interface 156, such that an external computer can display the result of the verification to the user.

Periodically and/or intermittently, the printer 154 can communicate with a data collector 176. In the present example, the data collector 176 can be implemented as a client computer 178 with a data collector client 180 that executes in memory of the client computer 178 and a server computer 182 that communicates with the client computer 178 over a network 184 (e.g., the Internet and/or a private network) and includes a data collector server 186 that executes in memory of the server computer 182.

The data collector client 180 can provide a request to the formatter 162 for the verification records, which can be referred to as a verification record request. The verification record request can include a request identifier. In examples where the data storage 174 is implemented as secure NVRAM, the data collector client can forward the request for the verification records to the security chip 170. In response, the security chip 170 can retrieve the verification records from the data storage 174. The security chip 170 can digitally sign the verification records and the request identifier with the private key of the security chip 170. Moreover, the security chip 170 can return the digitally signed verification records and the digitally signed request identifier to the formatter 162. In examples where the data storage 174 is implemented as unsecure NVRAM, the formatter 162 can access the data storage 174 and retrieve the verification records. Moreover, the formatter 162 can provide the request identifier to the security chip 170. In response, the security chip 170 can digitally sign the request identifier and return the digitally signed request identifier to the formatter 162. In some examples, the security chip 170 can also forward the stored digital signature to the formatter 162.

The formatter 162 can provide the digitally signed request identifier, the digitally signed verification records and the stored digital signature to the data collector client 180. The data collector client 180 can forward the digitally signed request identifier, the digitally signed verification records and the stored digital signature to the server computer 182 via the network 184. The data collector server 186 can employ a public key of the security chip 170 to verify the digital signature of the request identifier and the verification records. Additionally, the data collector server 186 can verify an authenticity of the security chip 170 by employing the stored digital signature. Moreover, the data collector server 186 can evaluate a verification history of the verification records to check for double usage of the replaceable supplies identified in the verification records. The data collector server 186 can store a history record associated with the printer 154 in a database that can characterize a verification history for the printer 154. The database could be implemented, for example, in a manner similar to the database 16 illustrated in FIG. 1. The history record could be implemented, for example, as the history record 100 illustrated in FIG. 3.

The data collector server 186 can determine if a usage credit stored in a history record associated with the printer 154 meets or exceeds a reward threshold. If the usage credit meets or exceeds the reward threshold, the data collector server 186 can determine that a reward for a user of the printer 154 is warranted. Further, the data collector server 186 can employ the request identifier to ensure that the reward has not already been granted to the user for a current state of the history record associated with the printer 154. Upon such determinations, a user of the printer 154 and/or the client computer 178 can be provided with a corresponding reward (e.g., an extended warranty, free or reduced price replaceable supply, a new printer, etc.).

Figure 5:
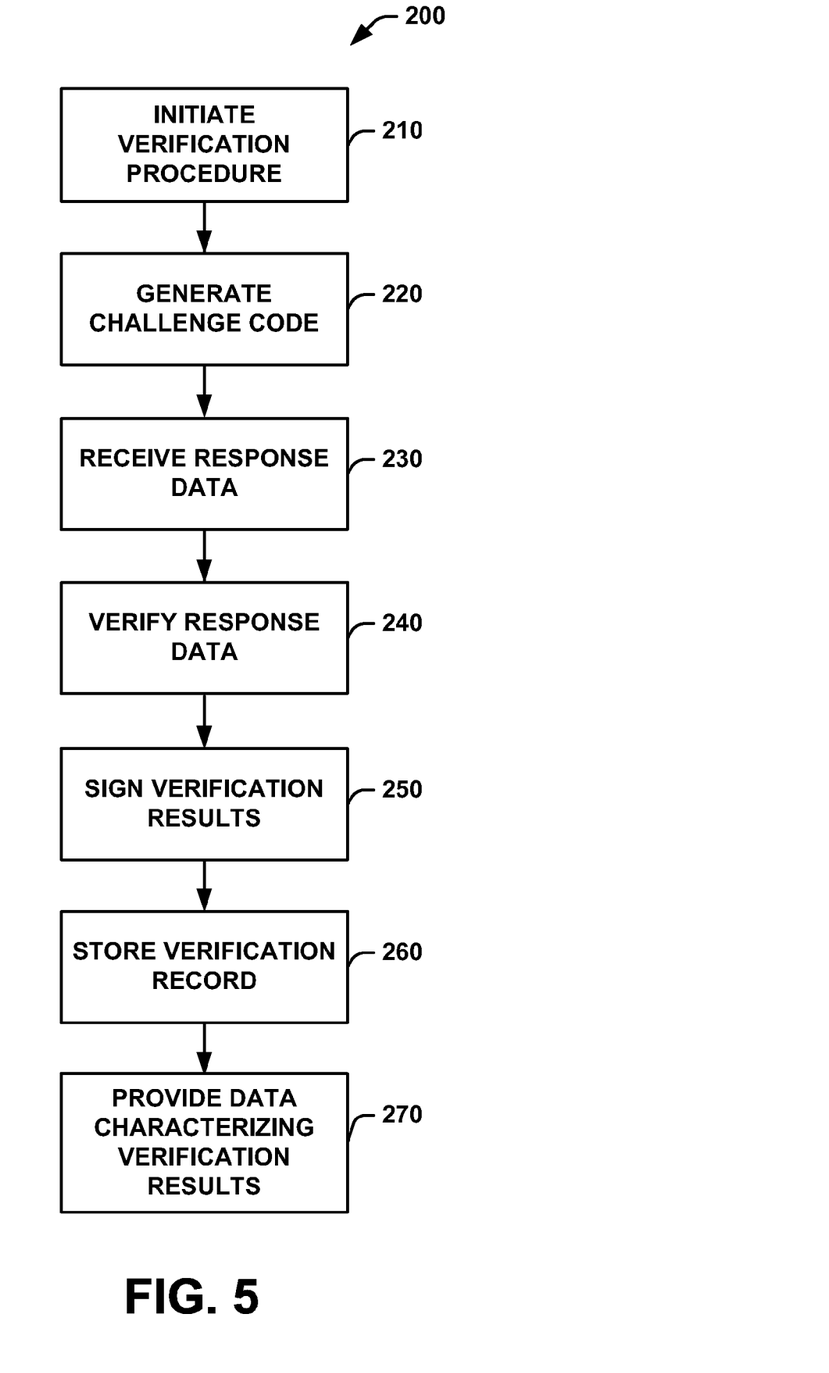
FIG. 5 illustrates an example of a flowchart of an example method for verifying a replaceable supply.
Figure 6:
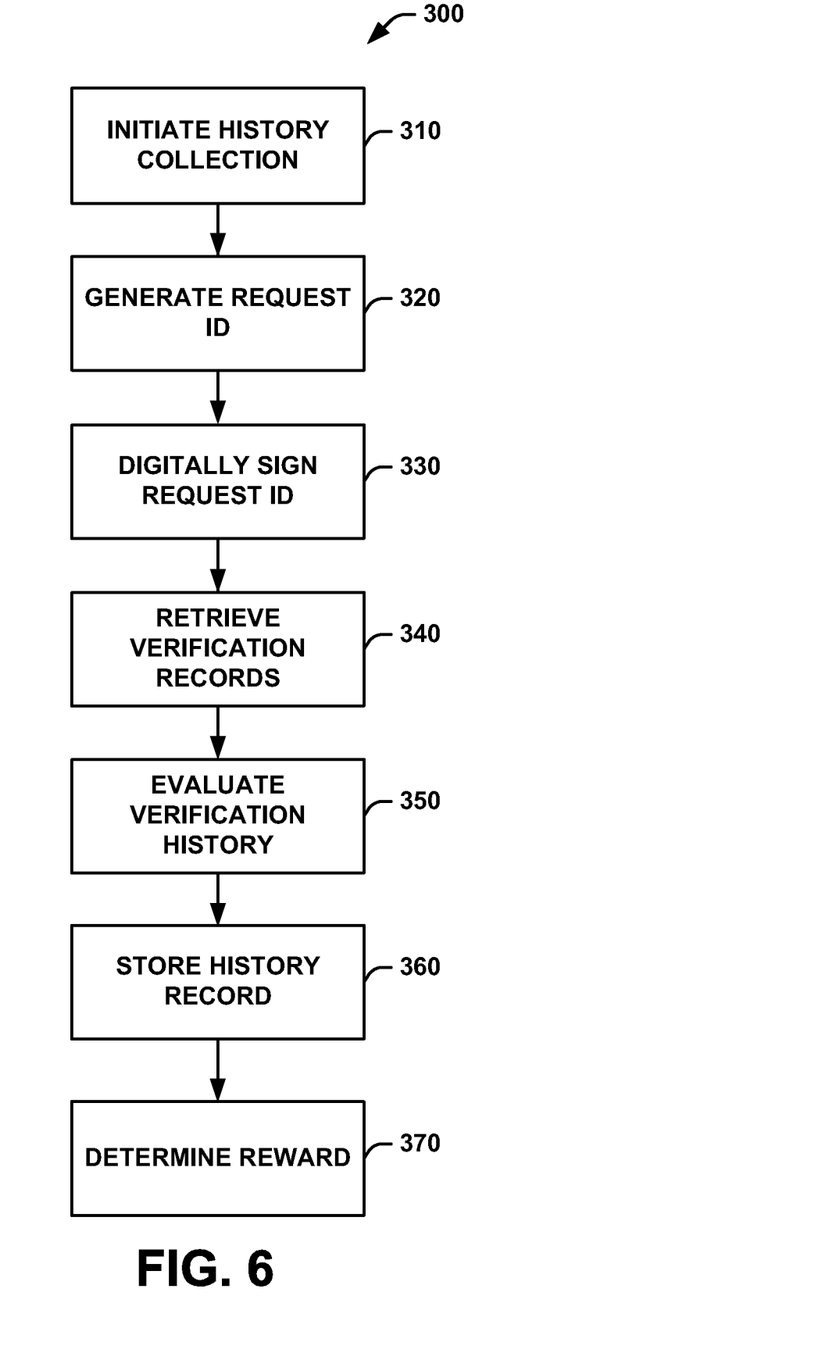
FIG. 6 illustrates an example of a flowchart of an example method for collecting a verification history.
Figure 7:
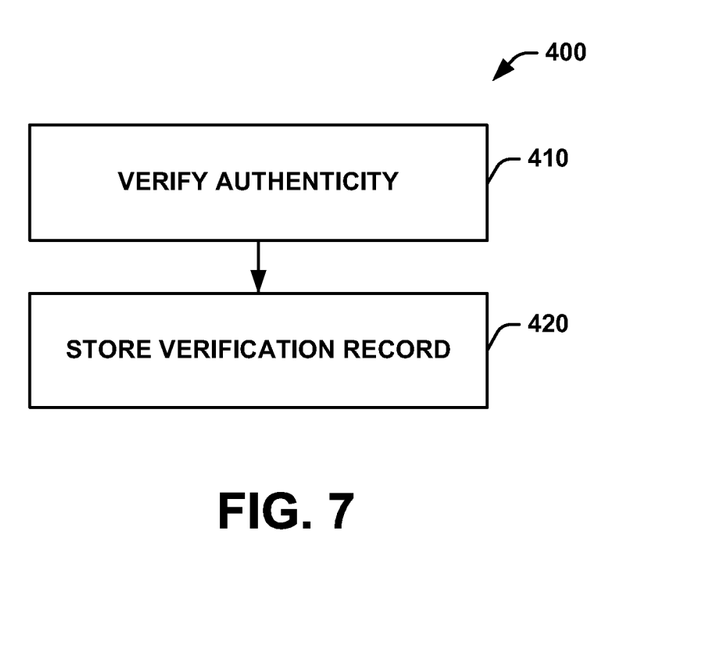
FIG. 7 illustrates another example of a flowchart of an example method for verifying a replaceable supply.

In view of the foregoing structural and functional features described above, example methods will be better appreciated with reference to FIGS. 5-7. While, for purposes of simplicity of explanation, the example methods of FIGS. 5-7 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 5 illustrates a flow chart of an example method 200 for verifying authenticity of the replaceable supply in a printer that could be executed, for example, by the printer 6 illustrated in FIG. 1 or the printer 154 illustrated in FIG. 4. At 210, a verification procedure can be initiated. The verification procedure can be initiated, for example in response to a controller of the printer detecting a new replaceable supply inserted into the printer. In other examples, the verification procedure can be initiated periodically and/or randomly. At 220, a challenge code can be generated by a security chip of the printer in response to a request from the controller. The challenge code could be implemented, for example, as a cryptographically generated random number. The challenge code can be provided to a memory tag of the replaceable supply. At 230, the controller can receive response data from the memory tag of the replaceable supply and forward the response data to the security chip. In some examples, the response data can include a digitally signed version of the challenge code. In such a situation, the memory tag can employ a private key stored in the memory tag to digitally sign the challenge code. In some examples, the response data can include additional information, such as a model of the replaceable supply, a life indicator of the replaceable supply, a serial number of the replaceable supply and manufacturing date of the replaceable supply, etc.

At 240, the security chip of the printer can verify the response data. Verification of the response data can include, for example, verifying the digital signature of the challenge code. At 250, results of the verification can be signed by the security chip of the printer. Verification of the response data can determine whether the replaceable supply is authentic (e.g., a genuine OEM replaceable supply). At 260, a verification record can be stored in data storage (e.g., by the security chip or the controller of the printer). The verification record could be implemented, for example in a manner similar to the verification record 50 illustrated in FIG. 2. Moreover, the data storage could be implemented, for example, as secure or unsecure NVRAM, such as described herein.

At 270, the controller of the printer can provide data characterizing the results of the verification. The data characterizing the results of the verification could be provided to a user of the printer. In some examples, such data could be provided by the printer, while in other examples, such data could be provided by an external computer coupled to the printer.

FIG. 6 illustrates a flow chart of an example method 300 for collecting and verifying a verification history of a printer. The method could be implemented, for example, by the system 2 illustrated in FIG. 1, and/or the system 150 illustrated in FIG. 4. At 310, a history collection procedure can be initiated, for example, by a data collector, such as the data collector 14 illustrated in FIG. 1 or the data collector 176 illustrated in FIG. 4. At 320, the data collector can generate a request identifier that can be provided to a security chip of a printer. At 330, the security chip can digitally sign the request identifier. At 340, verification records can be retrieved from data storage. In some examples, such as in examples where the verification records are stored in nonsecure NVRAM, a controller of the printer can retrieve the verification records. In other examples, such as examples where the verification records are stored in secure NVRAM, the security chip of the printer can retrieve the verification records, and digitally sign the verification records. The verification records can be provided to the data collector.

At 350, the data collector can evaluate a verification history for the printer. The verification of the verification history can include, for example, verifying a digital signature of the request identifier of the security chip. Additionally, in some examples, evaluation of the verification history can include verifying an authenticity of the security chip by employing a stored digital signature of the security chip. Moreover, the verification of the verification history can include checking for double usage of the replaceable supply. At 360, the data collector can store a history record that characterizes the verification history of the printer in a database. The history record could be implemented, for example, in a manner similar to the history record 100 illustrated in FIG. 3. At 370, the data collector can determine whether a reward for a user of the printer is warranted. The determination could be based, for example, on a comparison between a reward threshold and a usage credit in the history record for the printer and on a comparison of other history records associated with the printer.

FIG. 7 illustrates another flowchart of an example method 400 for verifying an authenticity of a replaceable supply for a printer. The method 400 could be executed, for example, by a printer (e.g., the printer 6 illustrated in FIG. 1 or the printer 154 illustrated in FIG. 4). At 410, a security chip of the printer can verify an authenticity of the replaceable supply in the printer. The security chip could be implemented, for example, as the security chip 10 illustrated in FIG. 1. At 420, a verification record for a replaceable supply can be stored in a data storage, for example, by the security chip. The verification record can characterize the results of the verification of authenticity and a usage of the replaceable supply at the printer.

Figure 8:
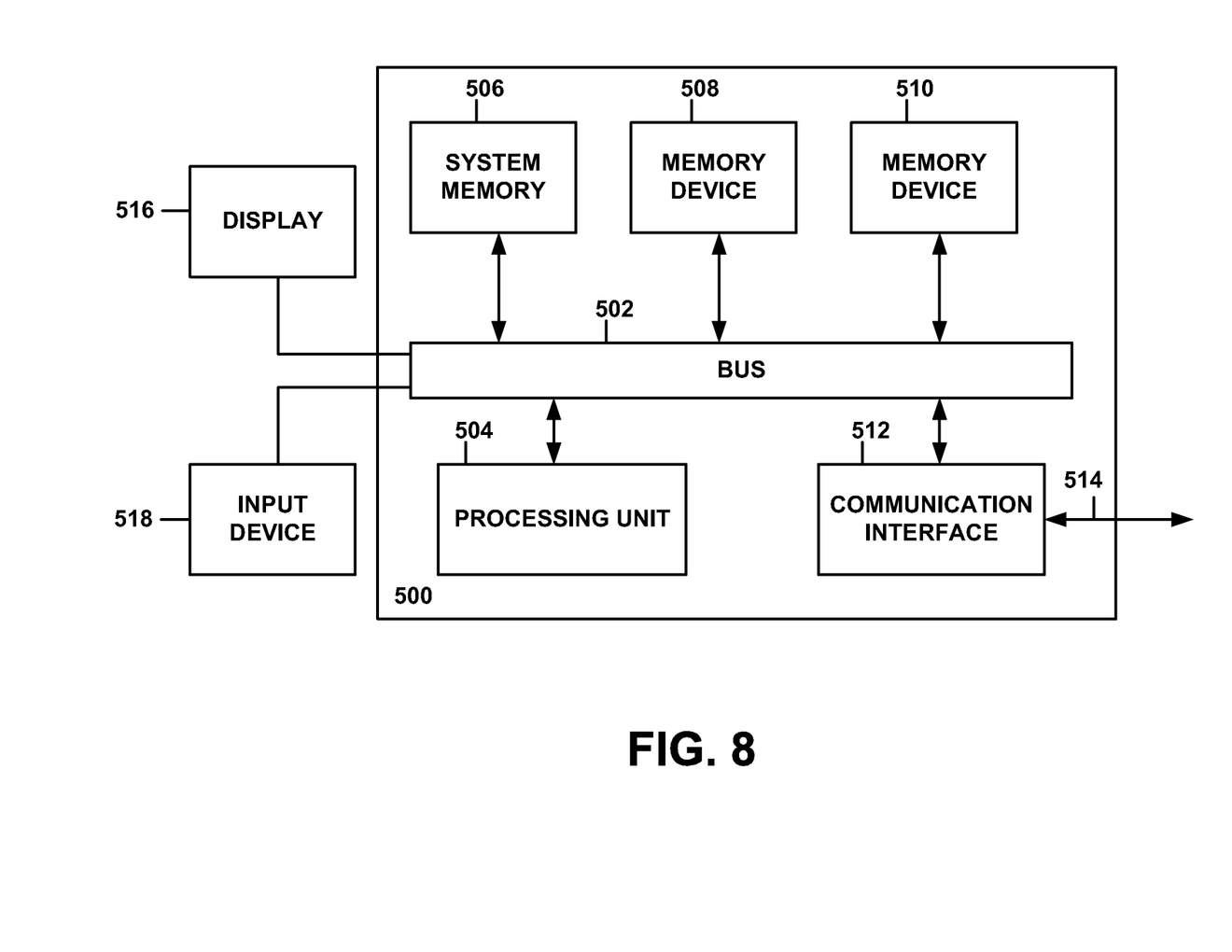
FIG. 8 illustrates an example of a computer system that can be employed to implement the systems and methods illustrated in FIGS. 1-7.

FIG. 8 is a schematic block diagram illustrating an example system 500 of hardware components capable of implementing examples disclosed in FIGS. 1-7, such as the data collector 14 illustrated in FIG. 1, the data collector 176 illustrated in FIG. 4, and portions of the printer 6 illustrated in FIG. 1 and/or the printer 154 illustrated in FIG. 4. The system 500 can include various systems and subsystems. The system 500 can be a personal computer, a laptop computer, a workstation, a computer system, an appliance, an application-specific integrated circuit (ASIC), a server, a server blade center, a server farm, a mobile device, such as a smart phone, a personal digital assistant, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand alone database, or other non-volatile memory, can also be in communication with the system bus 502. The system bus 502 operably interconnects the processing unit 504, the memory devices 506-510, the communication interface 512, the display 516, and the input device 518. In some examples, the system bus 502 also operably interconnects an additional port (not shown), such as a universal serial bus (USB) port.

The processing unit 504 can be a computing device and can include an ASIC. The processing unit 504 executes a set of instructions to implement the operations of examples disclosed herein. The processing unit can include a processor core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio.

Additionally, the memory devices 508 and 510 can serve as databases or data storage such as the data storage 12 illustrated in FIG. 1 and/or the database 16 illustrated in FIG. 1. Additionally or alternatively, the system 500 can access an external system (e.g., a web service) through the communication interface 512, which can communicate with the system bus 502 and the communication link 514.

In operation, the system 500 can be used to implement, for example, a client computer, a server computer, and at least some components of a printer. Computer executable logic for implementing the system, such as the data collector 14 illustrated in FIG. 1, the data collector client 180 and/or the data collector server 186 illustrated in FIG. 4, can reside in the system memory 506, and/or in the memory devices 508 and/or 510 in accordance with certain examples. The processing unit 504 executes one or more machine readable instructions originating from the system memory 506 and the memory devices 508 and 510. The term "computer readable medium" as used herein refers to a medium that participates in providing instructions to the processing unit 504 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A system comprising:
   a computer comprising:
   a memory to store machine readable instructions; and
   a processing unit to execute the machine readable instructions, the machine readable instructions comprising a data collector to:
   receive a plurality of verification records from a printer in response to a record request, wherein each verification record includes a digital signature, and wherein each verification record characterizes a usage of a given replaceable supply at the printer;
   receive a request identifier corresponding to the record request, the request identifier including another digital signature created at the time the record request is generated; and
   evaluate a verification history of the printer based on the plurality of verification records to determine a usage credit for the printer, the usage credit corresponding to a number of authentic replaceable supplies consumed at the printer.

2. The system of claim 1, wherein the printer comprises:
   a controller to initiate a verification of a replaceable supply inserted into the printer; and
   a security chip to:
   cryptographically verify an authenticity of the replaceable supply to determine whether the given replaceable supply is a genuine original equipment manufacturer (OEM) replaceable supply; and
   store results of the verification of the authenticity of the replaceable supply in a verification record of the plurality of verification records.

3. The system of claim 2, wherein the security chip comprises a secure crypto processor.

4. The system of claim 3, wherein the security chip is further to store the plurality of verification records in secure non-volatile random access memory (NVRAM).

5. The system of claim 4, wherein:
   the security chip is further to generate each digital signature and to digitally sign the verification records with a private key embedded in the security chip; and
   the data collector is further to verify the digital signature of the security chip with a public key corresponding to the private key of the security chip, wherein the data collector is to evaluate a verification history of the printer based on the plurality of verification records to determine the usage credit, the data collector is to:
   evaluate a number of pages printed by the printer for each replaceable supply in each verification record of the plurality of verification records to determine the usage credit; and
   determine whether a given supply in a verification record of the plurality of verification records is associated with another printer.

6. The system of claim 3, wherein:
the controller is further to store the plurality of verification records in an unsecure non-volatile random access memory (NVRAM); and
the controller is further to access the unsecure NVRAM and provide the verification records to the data collector.

7. The system of claim 1, wherein the data collector is further to evaluate a number of pages printed by the printer for each replaceable supply in each verification record of the plurality of verification records to determine the usage credit.

8. The system of claim 1, wherein the replaceable supply comprises one of an ink cartridge and a toner cartridge for the printer.

9. The system of claim 1, the data collector further to authenticate each verification record based on the respective digital signature.

10. A method comprising:
verifying an authenticity of a replaceable supply in a printer; and
storing a verification record that includes a digital signature for a replaceable supply in a data storage, wherein the verification record characterizes the results of the verification of authenticity and a usage of the replaceable supply at the printer and;
storing a request identifier corresponding to a record request, the request identifier including another digital signature created at the time the record request is generated.

11. The method of claim 10, further comprising evaluating a verification history of the printer based on a plurality of verification records received from the printer.

12. The method of claim 11, wherein the evaluating further comprises determining whether a given supply in a verification record of the plurality of verification records is associated with another printer.

13. The method of claim 10, wherein the replaceable supply comprises one of an ink cartridge and a toner cartridge for the printer.

14. The method of claim 10, wherein the verification determines whether the replaceable supply is a genuine original equipment manufacturer (OEM) replaceable supply.

15. The method of claim 10, further comprising:
determining that the replaceable supply has been refilled; and
incrementing the usage of the verification record for the refilled replaceable supply.

16. The method of claim 15, further comprising:
generating the record request, wherein the record request includes the request identifier; and
digitally signing the request identifier with data to characterize the time that the record request is generated.

17. The method of claim 15, wherein determining that the replaceable supply has been refilled further comprises evaluating the verification record for the refilled replaceable supply to determine a usage level of the replaceable supply at a first time and a usage level of the replaceable supply at a second time, wherein the usage level at the first time is greater than the usage level at the second time indicating that the replaceable supply has been refilled.

18. A system comprising:
a printer comprising:
a controller to initiate a verification procedure for a replaceable supply in the printer;
a security chip to:
verify an authenticity of the replaceable supply in the printer; and
store results of the verification of authenticity in a verification record; and
a computer in communication with the printer, the computer comprising:
a memory to store machine readable instructions; and
a processing unit to execute the machine readable instructions, the machine readable instructions comprising a data collector to:
receive a plurality of the verification records from the printer;
determine a usage credit that characterizes a number of replaceable supplies consumed at the printer; and
determine a reward for a specific user of the printer based on the usage credit that is associated with a signed request identifier.

19. The system of claim 18, wherein the usage credit is based on a page count stored in each of the plurality of verification records that characterizes a number of pages printed by the printer with a given replaceable supply.

20. The system of claim 18, wherein the reward comprises one of a warranty, another replaceable supply, and a printer.

* * * * *